US009867473B1

(12) United States Patent
Harrison

(10) Patent No.: US 9,867,473 B1
(45) Date of Patent: Jan. 16, 2018

(54) WRIST REST APPARATUS FOR GAMERS

(71) Applicant: Danny Levi Harrison, Glendale, CA (US)

(72) Inventor: Danny Levi Harrison, Glendale, CA (US)

(73) Assignee: HARRISON LEGACY 301, LLC, Glendale, CA (US)

( * ) Notice: Subject to any disclaimer, the term of this patent is extended or adjusted under 35 U.S.C. 154(b) by 0 days.

(21) Appl. No.: 15/422,977

(22) Filed: Feb. 2, 2017

(51) Int. Cl.
*F16M 11/02* (2006.01)
*A47C 16/00* (2006.01)
*H05B 3/28* (2006.01)

(52) U.S. Cl.
CPC .............. *A47C 16/00* (2013.01); *H05B 3/28* (2013.01)

(58) Field of Classification Search
CPC .................................. H05B 3/28; A47C 16/00
See application file for complete search history.

(56) References Cited

U.S. PATENT DOCUMENTS 5,188,095 A * 2/1993 Healy .................... A61H 1/005 601/59
5,686,005 A * 11/1997 Wright, Sr. ........... G06F 3/0395 219/201
2014/0186084 A1* 7/2014 Dickenson ............ G06F 1/1664 400/489

* cited by examiner

*Primary Examiner* — Amy J. Sterling
(74) *Attorney, Agent, or Firm* — Cotman IP Law Group, PLC

(57) ABSTRACT

Conditioning devices for gainers and eSports athletes are presented. The devices includes a wrist rest device, a massage sleeve, a hand exercise bracelet, a knuckle bracelet and a tri-finger exercise device. The wrist rest device is configured to provide appropriate warmth to the forearms while gaming, using a keyboard, or any data input device. The massage sleeve is configured to be wrapped around a person's forearm. It includes multiple elevated geometric shapes that are be built into the fabric of the material to provide appropriate pressure along the musculature of the wrist and forearm. The hand exercise bracelet, the knuckle bracelet and the tri-finger exercise device are configured for increasing the flexion, extension, abduction, adduction and intrinsic muscle strength of fingers, wrists, and forearms especially for individuals who do extensive amounts of keyboarding as well as texting, typing, gaming, and data entry.

12 Claims, 12 Drawing Sheets

WRIST REST APPARATUS FOR GAMERS

BACKGROUND OF THE INVENTION

Field of the Invention

Embodiments of the invention relates to apparatuses for preventing repetitive stress traumas by strengthening and conditioning the upper extremities. More specifically, the invention relates to a conditioning device for the upper extremities including wrists and forearms.

Description of the Related Art

Participants in a variety of activities that involve video game consoles, computer keyboards, and other input devices, often experience discomfort in and around the upper extremities, e.g. forearms and wrists. Many of these ailments can be directly attributed to improper positioning of the forearm and wrist, particularly when keyboarding, mouse use, or game console use which can cause overuse or repetitive-stress.

As is often the case with overuse or repetitive-stress injuries, minimizing the activity which caused the tendinitis is usually an effective treatment. However, patients are often unwilling to forego the offending activity for an extended period of time. Thus, there is a need for devices that help strengthen the musculature of the upper extremities and also relaxes and massages the fingers, wrists and forearms.

BRIEF SUMMARY OF THE INVENTION

One or more embodiments of the invention are directed at conditioning devices for gamers and eSports athletes. The conditioning devices comprise a wrist rest apparatus, a massage sleeve, a hand exercise bracelet, a knuckle bracelet and a tri-finger exercise device. The wrist rest apparatus comprises a plurality of panels coupled together to form a wrist rest assembly for a user of a computer input device.

In one or more embodiments, each panel is a wedge-shaped rectangular structure, preferably a gel pad, with a sloping top surface from the proximal end to the distal end. The top surface includes a plurality of ridges configured to minimize direct pressure on the nerves, blood vessels and muscle tissue of the wrist and forearm. The ridges are compressible and slanted at a desired angle, e.g. approximately between 15 to 20 degrees, to provide some cushioning effect and to minimize hyperextension or hyperflexion of the wrist.

In one or more embodiments, the panel further comprises a flap on the left side of the structure and a second flap on a right side of the structure. The flaps are configured for coupling to a second panel and may be made of the same material as the rest of the structure of panel. The flap could also be made of other types of material like a fabric or felt.

In one or more embodiments, the left side flap is in the same horizontal plane as the right side flap or in a different horizontal plane so that when two panels are coupled side by side, the assembly lays flat on a horizontal surface, e.g. table. In other embodiments, either of the flaps may be configured as a slot for the other flap to slide in. For example, if the left side flap is configured as a single strip of material, then right side flap may be configured as a slot to hold the left side flap of a second panel.

In one or more embodiments, the panel structure further comprises a plurality of glide protectors at the bottom side of the panel configured to provide resistance from sliding or slipping on the resting surface. The glide protectors may comprise of softer rubbery or felt material than the panel structure.

In one or more embodiments, each panel further comprises a heating coil (or element) inside the structure for providing warmth to a person's forearms while gaming, using a keyboard, or any other type of hand-operable input device. The heating coil comprises a male connector on one end and a female connector on the opposing end for coupling to a power source and to a second panel. The connectors could be USB or any other type that provides power.

The massage sleeve apparatus comprises a main body fabric material configured to be wrapped around a person's forearm. The main body is shaped essentially as an isosceles trapezoid that fits snugly around the forearm, when folded around a person's forearm.

In other embodiments, the main body may also be shaped as a cone with a flat top thus does not necessarily have to be flat and trapezoidal when opened. For instance, the main body may comprise two sections of a flat top cone hinged together. Those of skill in the art would appreciate that other shapes are also contemplated so long as the massage sleeve wraps around the forearm of the user.

In one or more embodiments, fastener components coupled to opposing sides of the main body are used to secure the massage sleeve to the forearm. Different types of fasteners may be used, for example, hook and loop fasteners, hook-and-pile fasteners, touch fasteners, buttons, etc.

In one or more embodiments, a plurality of elevated geometric type shapes are coupled on the inside face of main body. The geometric shapes may be configured as part of the fabric material to provide appropriate pressure along the musculature of the wrist and forearm. They are configured to minimize direct compression of the vessels, nerves and muscles of the forearm.

In one or more embodiments, the geometric shapes comprises a first row of a plurality of rhombus shapes with one or more s-shaped (i.e. approximately sinusoidal) ridges with varying lengths, alternating with a second row of a plurality of rhombus shapes with one or more mounds, e.g. round mounds or plus shaped mounds. The geometric shapes further comprises a trapezoid on each side of a stingray shape configured to minimize direct pressure on the radial and ulnar nerves by being positioned oblique to the nerves. The stingray shape comprises one or more s-shaped ridges with varying lengths configured to minimize direct pressure on the median nerve.

In one or more embodiments, the geometric shapes are elevated with varying heights and configured to provide appropriate pressure and counter pressure points for the musculature, vessels, and nerves of the wrist and forearm.

In one or more embodiments, the mounds comprise magnetic massage balls or copper coils.

In one or more embodiments, the massage sleeve further comprises an optional heating element. The heating element may be a resistive heater, e.g. a flexible PTC ("Positive Temperature Coefficient") heater made of conductive rubber, for example.

The hand exercise bracelet comprises a main body with two rings coupled together in a side-by-side configuration by a living hinge. The hand exercise bracelet is preferably made of resilient material.

In one or more embodiments, each ring comprises a center hole and a plurality of slots covered with flaps around the perimeter of the ring. For example, each ring has a flap/slot combination at the free end of the ring and flap/slot combination at the hinged end of the ring that could accommodate a person's thumb. Each ring further includes a plurality of flap/slot combinations on the top half of ring for each remaining digit of the hand, i.e. the person's fingers, and a plurality of flap/slot combinations at the bottom half of the ring for each remaining digit of the hand.

In one or more embodiments, each flap/slot combination on the first ring has a complementary flap/slot combination on the second ring such that complementary flaps/slots overlap when the hand exercise bracelet is folded about the living hinge.

In one or more embodiments, the hand exercise bracelet is formed with malleable type of material that returns to its form as well as maintains its functional and mechanical characteristics after deformation.

The knuckle bracelet is a device comprising a main body with two branches coupled through a hinge in a side-by-side configuration. The knuckle bracelet is preferably made of a resilient material with a foldable living hinge between the branches.

In one or more embodiments, each branch comprises a digit hole for each digit of the hand. For example, a first digit hole for the thumb, a second digit hole for the index finger, a third digit hole for the middle finger, a fourth digit hole for the ring finger, and fifth digit hole for the little finger. Each first branch may also include one or more holes in the body and between the digit holes that functions to modify (e.g. reduce) the force required for abduction of the fingers.

In one or more embodiments, the plurality of digit holes is arranged along the length of each branch such that the first digit hole is closest to the hinge for the thumb, followed by the second digit hole for the index finger, followed by the third digit hole for the middle finger, followed by the fourth digit hole for the ring finger, and followed by the fifth digit hole for the little finger.

In one or more embodiments, the each digit hole comprises a plurality of elevated ridges on its inside surface to help minimize direct pressure on the muscles and vessels of the thumb and fingers. The ridges also provide a massaging effect on the thumb and fingers.

In one or more embodiments, a user is able to perform both abduction and adduction of the fingers and/or arms by inserting all the digits of both hands into the digit holes of the knuckle bracelet.

In one or more embodiments, the knuckle bracelet is formed with malleable type of material that returns to its form as well as maintains its functional and mechanical characteristics after deformation.

The tri-finger exercise device comprises a main body with three rings connected in a triangular formation via bridges. In one or more embodiments, each ring comprises an inside diameter that is configured to snugly fit a person's finger or thumb and a depth that is approximately half the length of the person's finger. The inside surface of each ring comprises a plurality of elevated and flexible inner ridges that are approximately sinusoidal in shape and run the depth of the ring. The irregular shaped inner ridges are configured to provide massage while minimizing direct pressure on the nerves, vessels and tendons of the digits of the hand, i.e. fingers and thumb.

In one or more embodiments, the outside surface of each ring comprises one or more elevated and flexible outer ridges that are approximately sinusoidal in shape around the outside facing perimeter between the two connecting bridges. Each ring further comprises one or more elevated ridges that are approximately sinusoidal in shape and run the depth of the surface of the ring on the inside facing perimeter between the two connecting bridges.

In one or more embodiments, each bridge connecting two rings comprises an inside surface with a plurality of elevated and flexible inner ridges that are approximately sinusoidal in shape and run the width of the bridge. The irregular shaped inner ridges are configured to provide massage while minimizing direct pressure on the nerves, vessels and tendons of the digits of the hand, i.e. fingers and thumb.

In one or more embodiments, the outside surface of each bridge comprises one or more elevated and flexible ridges that are approximately straight and parallel and run the width of the bridge.

In one or more embodiments, the tri-finger exercise device is formed with malleable type of material that returns to its form as well as maintains its functional and mechanical characteristics after deformation.

BRIEF DESCRIPTION OF THE DRAWINGS

The above and other aspects, features and advantages of the invention will be more apparent from the following more particular description thereof, presented in conjunction with the following drawings wherein.

DETAILED DESCRIPTION

Figure 1A:
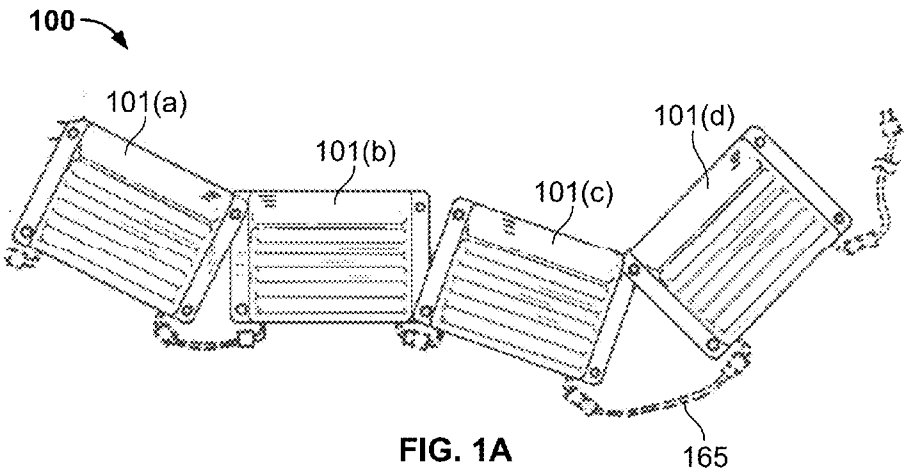
FIG. 1A is a top plan view of a wrist rest assembly with four wrist rest modules in accordance with one or more embodiments of the present invention.

The present invention comprising conditioning devices for garners and eSports athletes will now be described. In the following exemplary description, numerous specific details are set forth in order to provide a more thorough understanding of embodiments of the invention. It will be apparent, however, to an artisan of ordinary skill that the present invention may be practiced without incorporating all aspects of the specific details described herein. Furthermore, although steps or processes are set forth in an exemplary order to provide an understanding of one or more systems and methods, the exemplary order is not meant to be limiting. One of ordinary skill in the art would recognize that the steps or processes may be performed in a different order, and that one or more steps or processes may be performed simultaneously or in multiple process flows without departing from the spirit or the scope of the invention. In other instances, specific features, quantities, or measurements well known to those of ordinary skill in the art have not been described in detail so as not to obscure the invention. It should be noted that although examples of the invention are set forth herein, the claims, and the full scope of any equivalents, are what define the metes and bounds of the invention.

For a better understanding of the disclosed embodiment, its operating advantages, and the specified object attained by its uses, reference should be made to the accompanying drawings and descriptive matter in which there are illustrated exemplary disclosed embodiments. The disclosed embodiments are not intended to be limited to the specific forms set forth herein. It is understood that various omissions and substitutions of equivalents are contemplated as circumstances may suggest or render expedient, but these are intended to cover the application or implementation.

The term "first", "second" and the like, herein do not denote any order, quantity or importance, but rather are used to distinguish one element from another, and the terms "a" and "an" herein do not denote a limitation of quantity, but rather denote the presence of at least one of the referenced item.

Wrist Rest Device

The wrist rest device is configured to provide appropriate ergonomic balance and assist in order to maintain the wrist in a functional position without being in a hyperflexed or hyperextended position while keyboarding, using a mouse, or game console. The wrist rest device is preferably configured as modular panels that can be coupled together in any desired configuration. For instance, the panels can be coupled together in a horizontal fashion, manipulated whereby the panels are coupled in a zig-zag configuration, coupled in a U configuration, or any other desired configuration. The panels may be coupled in a configuration that suits the person using the device for their preferred comfort position.

In one or more embodiments of the present invention, the wrist rest device is configured to provide appropriate warmth to the forearms while gaming, using a keyboard, or any data input device. The device is generally used at a desk to provide additional ergonomic balance for the upper extremity to minimize cumulative repetitive stress trauma as well as to prevent any type of nerve impingement issues such as the possibility of getting carpal tunnel syndrome and/or other types and forms of tendinitis of the fingers, wrist, and forearm.

The texture of each panel is rugated to minimize direct pressure on the nerves, vessels and tendons of the wrist and forearm. The various embodiments of the wrist rest device will now be described with references to FIGS. 1A-1D.

FIG. 1A is a top plan view of a wrist rest assembly 100 with four wrist rest panels 101 coupled together in accordance with one or more embodiments of the present invention. The wrist rest assembly 100 is a kinematically and ergonomically designed device that is specifically intended to provide relaxation to the wrist while using a hand operated input device, e.g. keyboard, mouse, game console, etc. The wrist rest assembly 100 provides appropriate balance and rest to the wrist by maintaining the wrist in a functional and relaxed position, i.e. without being in a hyperflexed or hyperextended position, while using a keyboard, mouse or game console (see FIG. 1D).

As illustrated in FIG. 1A, the wrist rest assembly 100 comprises a plurality (e.g. four) of panels 101 coupled in a configuration that the user desires. For instance, a plurality of panels 101 can be coupled together in a horizontal fashion, placed in a zig-zag position, placed in an angular position whereby the two side panels, i.e. 101(*a*) and 101(*d*), are be placed in a U-type position. Thus, panel 101 is configured such that when more than one panel is coupled together, all the coupled panels can be manipulated appropriately and individually by a user of the assembly to suit their comfort level. Those of skill in the art would appreciate that, although four panels are coupled together in this illustrative example, any number (i.e. one or more) of panels may be coupled together to form the wrist rest assembly 100.

In one or more embodiments, panel 101 includes an optional heating coil (or element) 160 inside the structure for providing warmth to a person's forearms while gaming, using a keyboard, or any other type of hand-operable input device. The heating coil 160 comprises a male connector, e.g. 161, on one end and a female connector, e.g. 162, on the opposing end. The connectors could be USB, for example. Those of skill in the art would appreciate that any other types of connectors may also be used and that the positions of male and female connectors could be swapped so long as it accomplishes the function of providing power for the heating coils, especially to the panels at the edges, e.g. 101(*a*) and 101(*d*).

The wrist rest assembly 100 is preferably used at a desk to provide additional ergonomic balance for the upper extremity, to minimize cumulative repetitive stress trauma, as well as preventing any type of nerve impingement issues such as the possibility of getting carpal tunnel syndrome and/or other types and forms of tendinitis of the fingers, wrist, and forearm.

Figure 1B:
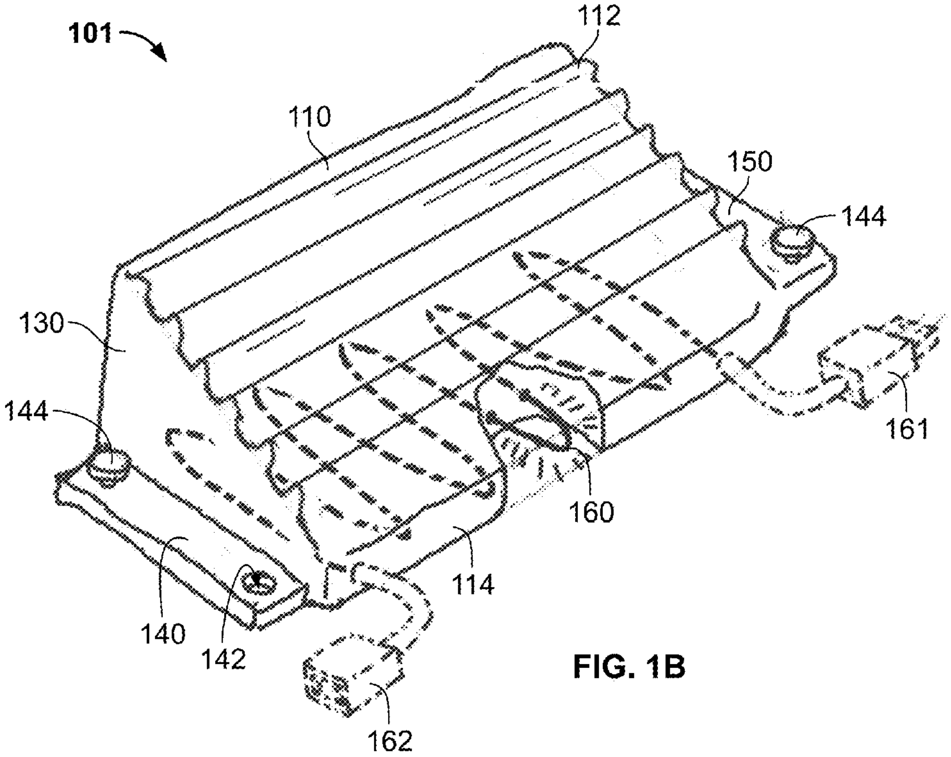
FIG. 1B is a perspective view of a wrist rest module with a cutout section showing an optional heating coil in accordance with one or more embodiments of the present invention.
Figure 1C:
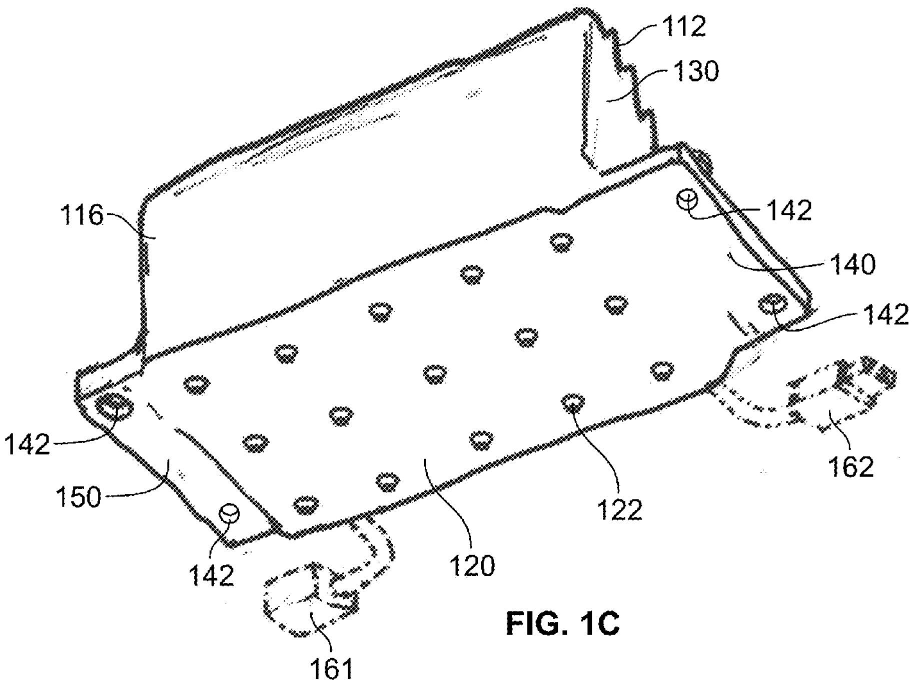
FIG. 1C is a bottom perspective view of the wrist rest module in accordance with one or more embodiments of the present invention.

FIGS. 1B and 1C are different views of the wrist rest panel 101. FIG. 1B is a perspective view of the wrist rest panel 101 with a cutout section showing the optional heating coil 160, while FIG. 1C is a bottom perspective view of the wrist rest panel 101. As illustrated, wrist rest panel 101 is a wedge-shaped rectangular structure, preferably a gel pad, with a sloping top, i.e. increasing height from the proximal side 114 to the distal side 116.

In one or more embodiments, panel 101 is approximately 8 inches in width with a slope of approximately 10 degrees. It should be noted that embodiments with different widths and slopes are contemplated. For instance, the slope could range from 5 degrees to 15 degrees, or even higher. The width could also range from approximately 4 inches to 24 inches, or higher.

Figure 1D:
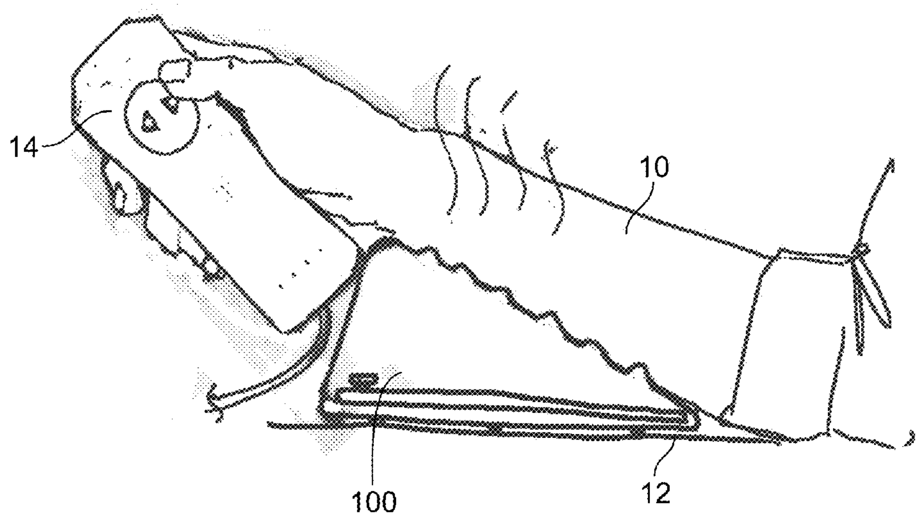
FIG. 1D is an illustration of an exemplary use of the wrist rest assembly in accordance with one or more embodiments of the present invention.

In one or more embodiments, the top side 110 of panel 101 has a rugated texture, i.e. with a plurality of ridges 112, which is configured to minimize direct pressure on the nerves, blood vessels and muscle tissue of the wrist and forearm (see FIG. 1D). The ridges are configured such that there is minimal flat compression of the wrist and forearm on the pad. For instance, the ridges may be compressible and may also be slanted at a desired angle, e.g. approximately between 15 to 20 degrees, to provide some cushioning effect.

Panel 101 further comprises a flap (or tab) 140 on the left side and flap 150 on the right side. Flaps 140 and 150 could be made of the same material as the rest of the structure of panel 101, or of other type material like a fabric, felt, etc. Flap 140 may also be in the same horizontal plane as flap 150 or in a different horizontal plane so that when two panels are coupled side by side, the assembly lays flat on the surface, e.g. table. In other embodiments, either of the flaps 140 or 150 may be configured as a slot (not shown) for the other flap to slide in. For example, if flap 140 is configured as a single strip of material, then flap 150 may be configured as a slot to hold flap 140 of a second panel 101.

In one or more embodiments, flaps 140 and 150 may also include one or more holes 142 which serve as coupling points for two panels. As illustrated in FIG. 1A, one or more couplers 144 may be used to secure two panels together. Coupler 144 may be a bolt, button, cap, plug, stud, or any other device suitable for coupling two panels together.

In one or more embodiments, the bottom side 120 of panel 101 comprises a plurality of glide protectors 122. The glide protectors could comprise of softer rubbery material, for example. The glide protector is configured to provide resistance for panel 101 from sliding or slipping on the resting surface 12, e.g. table, while the pad is in use.

FIG. 1D is an illustration of an exemplary use of the wrist rest device 100 in accordance with one or more embodiments of the present invention. As illustrated, when the user's forearm 10 is placed on the pad 100, while using an input device 14, the forearm and wrist are in a natural position and the ridges 112 on the top surface of the pad 100 provides for minimum continued surface area contact and pressure on the forearm 10.

Massage Sleeve

The massage sleeve provides appropriate massage to the forearm and wrist. The sleeve comprises multiple elevated geometric designs that may be built into the fabric of the material to provide appropriate pressure along the musculature of the wrist and forearm. The device may be configured as a carrier of warmth to the upper extremity as well as to provide appropriate pressure and counter pressure points for the musculature, vessels, and nerves of the forearm. The device is preferably configured to provide appropriate ergonomic balance and massage techniques for the upper extremity, especially for someone who does extensive amounts of writing, keyboarding, gaming, texting, typing, data entry, and drawing.

The sleeve may be easily applied by wrapping around the forearm and securing with a fastener to minimize extraneous movement. The sleeve can be configured or can be made configurable for different sizes, e.g. 7-inch design, a 9-inch design, and an 11-inch design. The various embodiments of the massage sleeve will now be described with references to FIGS. 2A-2E.

Figure 2A:
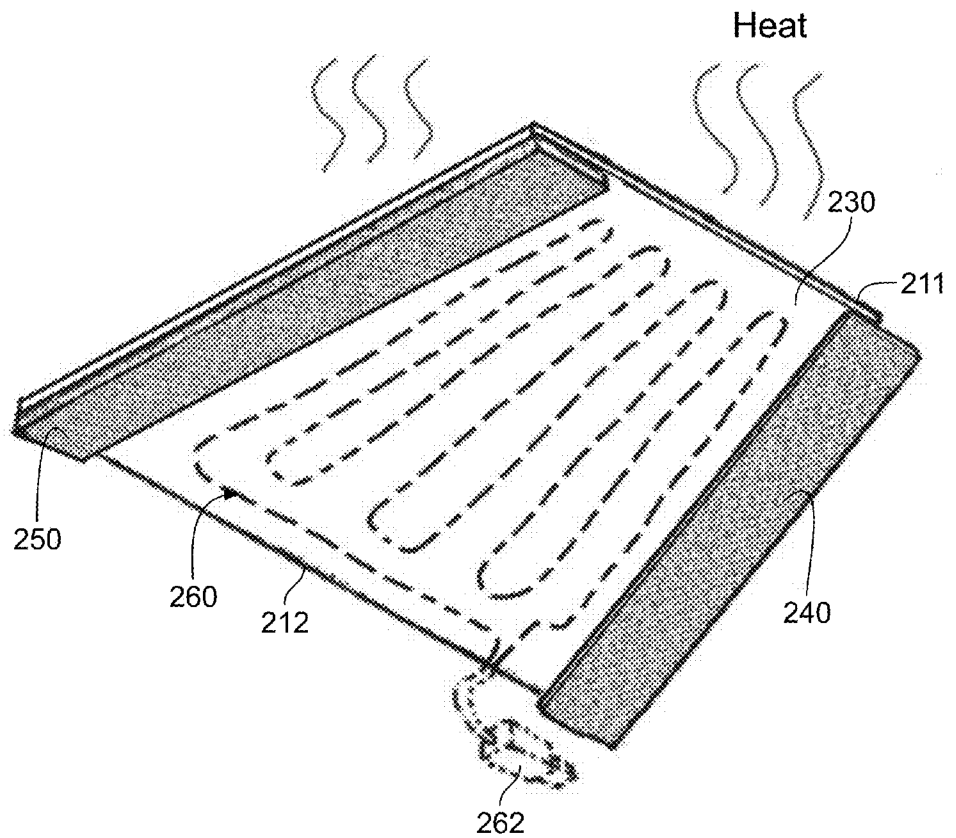
FIG. 2A is a top plan view of the outside face of the massage sleeve in accordance with one or more embodiments of the present invention.
Figure 2B:
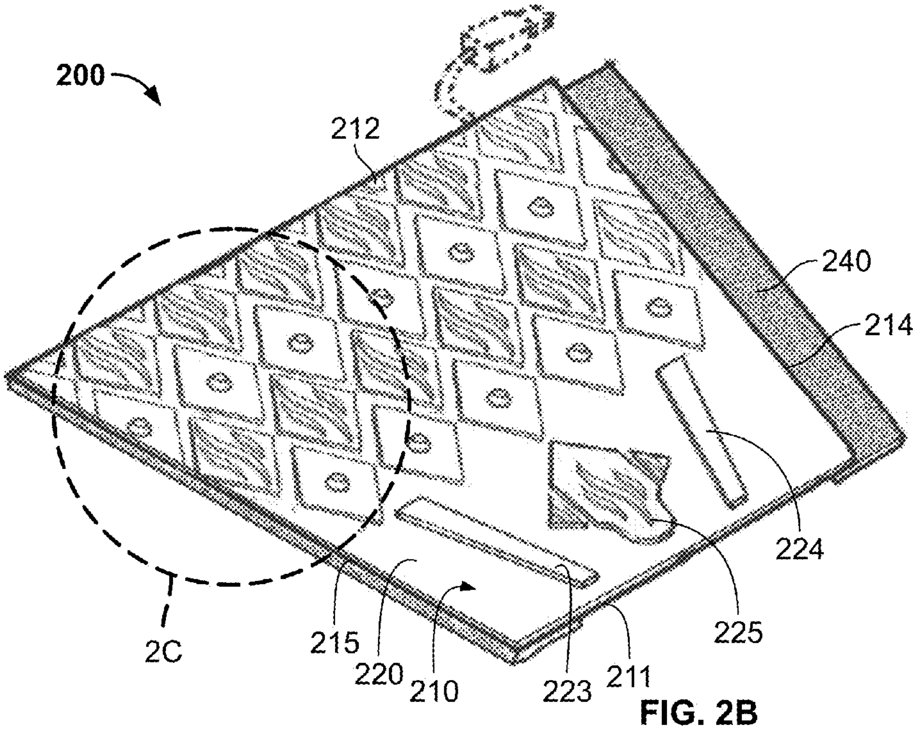
FIG. 2B is a perspective view of the inside face of a massage sleeve in accordance with one or more embodiments of the present invention.
Figure 2C:
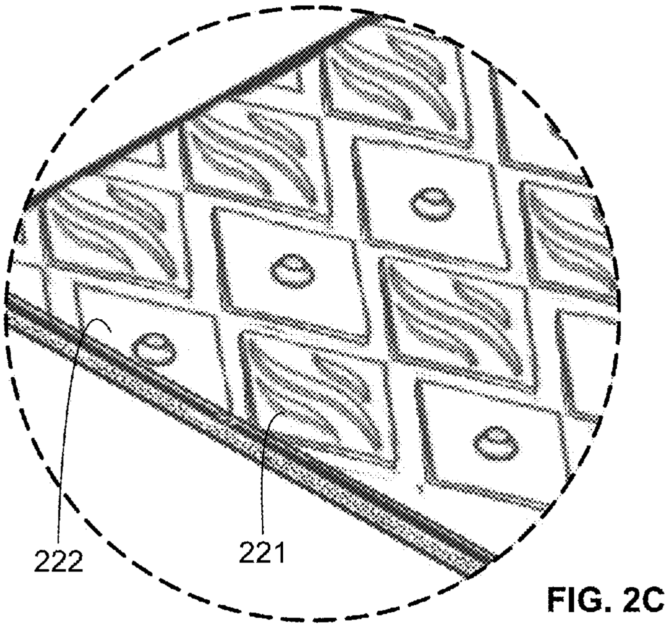
FIG. 2C is a close-up illustration of the inside of a massage sleeve in accordance with a first embodiment of the present invention.
Figure 2D:
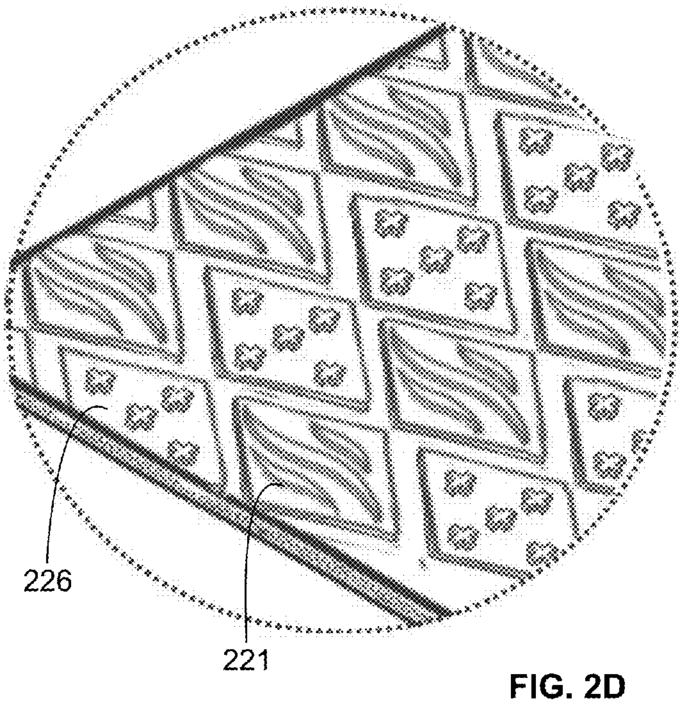
FIG. 2D is a close-up illustration of the inside of a massage sleeve in accordance with a second embodiment of the present invention.
Figure 2E:
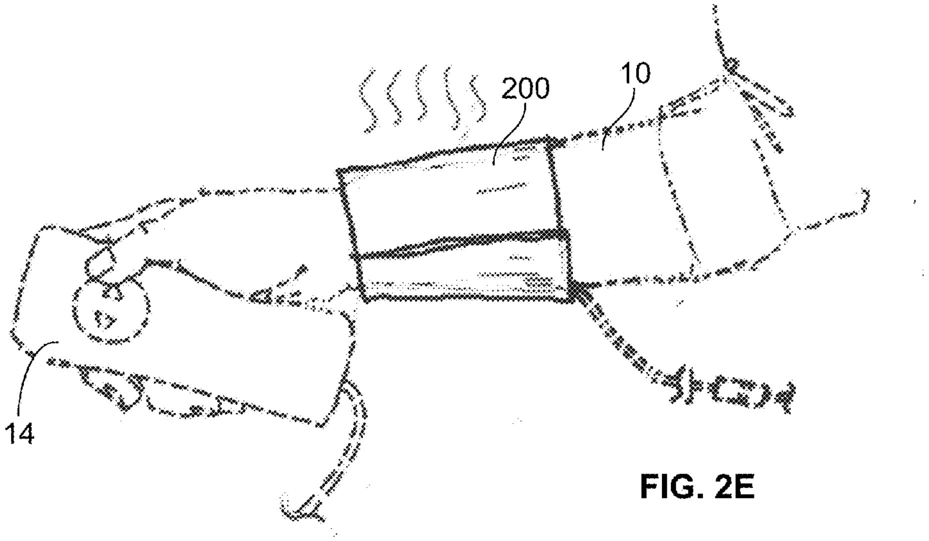
FIG. 2E is an illustration of an exemplary use of the massage sleeve in accordance with one or more embodiments of the present invention.

Massage sleeve 200 is configured to provide appropriate massage to the forearm and wrist when worn, as illustrated in FIG. 2E. FIG. 2A is a top plan view of the outside face 230 of the massage sleeve 200, showing the optional heating element, while FIG. 2B is a perspective view of the inside face 220 of the massage sleeve 200 in accordance with one or more embodiments of the present invention.

As illustrated, massage sleeve 200 comprises a main body fabric material 210 with an inside face 220 and an outside face 230. The main body is shaped essentially as an isosceles trapezoid such that, when folded around a person's forearm, it fits snugly around the forearm (See FIG. 2E). The main body 210 may also be shaped as a cone with a flat top thus does not necessarily have to be flat and trapezoidal when opened. For instance, the main body could comprise two sections of a flat top cone hinged together. Those of skill in the art would appreciate that other shapes are also contemplated so long as the massage sleeve wraps around the forearm of the user.

In the illustrated example, the distal or short end 211 of the parallel sides of the main body is configured to fit closer to the wrist, while the proximal or longer end 212 of the main body 210 is configured to fit closer to the elbow. Massage sleeve 200 further comprises fastener components 240 and 250 coupled to opposing sides 214 and 215, respectively. Different types of fasteners may be used, for example, hook and loop fasteners, hook-and-pile fasteners, touch fasteners, buttons, etc.

In the illustrated example, the fastener components, e.g. 240 and 250, are coupled on the outside face of the main body. Those of skill in the art would appreciate that the fastener components may be coupled on any side or combination of sides of the main body and that other type fasteners, e.g. clips and buttons, are contemplated so long as the chosen fastener serves the function of securing massage sleeve 200 around a person's forearm 10.

In one or more embodiments, massage sleeve 200 further comprises multiple geometric type shapes, e.g. 221 to 225, on the inside face 220 of main body 210 that may be configured as part of the fabric material to provide appropriate pressure along the musculature of the wrist and forearm. For instance, shape 221 comprises a rhombus with one or more s-shaped (i.e. approximately sinusoidal) ridges with varying lengths; shape 222 comprises a rhombus with one or more mounds, e.g. round mounds; shapes 223 and 224 are a form of a trapezoid; and shape 225 is configured like a stingray with one or more s-shaped ridges with varying lengths. These shapes are elevated with varying heights, e.g. approximately between 1.0 mm and 4.0 mm, preferably between 2.0 and 3.0 mm. As illustrated, the main body comprises two or more alternating rows of shapes 221 and 222, beginning at the proximal end 212 and continuing for approximately two thirds of the main body. Alternating between the mounds and lines, i.e. s-shape ridges, helps reduce direct pressure on the tendons, muscles, ligaments and vessels.

In one or more embodiments, the mounds in shape 222 could comprise magnetic massage balls or copper coils, for example.

In one or more embodiments, shape 225 is located centrally towards the distal end 211 of the main body. On each side of shape 225 is an elevated trapezoidal shape, e.g. 223 and 224, which starts near distal end 211 and runs for approximately the remainder of the main body. Shapes 223, 224 and 225 are configured to provide appropriate pressure and counter pressure points for the musculature, vessels, and nerves of the wrist. For instance, shape 225 is configured to minimize direct pressure on the median nerve, while shapes 223 and 224 are configured to minimize direct pressure on the radial and ulnar nerves by being positioned oblique to the nerves.

The massage sleeve 200 is configured to be a carrier of warmth to the upper extremity as well as provide appropriate pressure and counter pressure points for the musculature, vessels, and nerves of the forearm. The elevated shapes are configured to minimize direct compression of the vessels and muscles of the forearm.

In one or more embodiments of the present invention, the massage sleeve further comprises an optional heating element 260. The heating element may be a resistive heater, e.g. a flexible PTC ("Positive Temperature Coefficient") heater made of conductive rubber, for example. Resistive heaters can be made of conducting PTC rubber materials where the resistivity increases exponentially with increasing temperature. Resistive heaters produce high power when cold, and rapidly heats up to a constant temperature because of exponentially increasing resistivity. This constant temperature, typically between 0 and 80° C. (32 and 176° F.), can be specified during the production of the rubber. The PCT heater is self-regulating, i.e. every point of the heater independently keeps a constant temperature without the need of regulating electronics. It is also self-limiting because the heater can never exceed the constant temperature in any point thus requires no overheat protection.

Other types of heaters may also be used. For instance, heaters with variable temperature control so that the user may adapt the massage sleeve to their taste. The heating element may also include a connector 262, e.g. USB or other type connectors.

As illustrated in FIG. 2E, the massage sleeve 200 is easily applied by wrapping around the forearm, e.g. 10. The fasteners 250 and 240, e.g. loop and hook stabilizers, hold it in place to minimize extraneous movements. The massage sleeve may come in different sizes, e.g. a 7-inch design, a 9-inch design, and an 11-inch design.

The massage sleeve is configured to provide appropriate ergonomic balance and to massage the upper extremity, especially for someone who does extensive amounts of keyboarding, gaming, texting, typing, data entry, and drawing. The massage sleeve increases warmth and circulation around the forearm and provides for various massage techniques. For instance, the user can press on the outside face 230 to provide pressure, i.e. massage, to any part of the tendons, muscles, ligaments and vessels of the forearm.

In one or more embodiments of the present invention, shape 222 may be replaced with shape 226, as illustrated in FIG. 2D. FIG. 2D is a close-up illustration of the inside face of a massage sleeve in accordance with a second embodiment of the present invention. As shown, shape 226 comprises a rhombus or similar shape with one or more "plus" shaped mounds. Thus, it should be evident to one of ordinary skill in the art that the types and sizes of the shapes 221 through 226 may vary without deviating from the spirit of the invention so long as the functional effects described herewith are achieved.

Hand Exercise Bracelet

The hand exercise bracelet is ergonomically and appropriately configured to address the hand, wrist, and elbow strength musculature. The hand exercise bracelet can be used to increase the flexion and extension strength of fingers, wrists, forearms and elbows. The device is also intended to optimize the strengthening efforts for individuals who do extensive amounts of keyboarding as well as gaming, texting, typing, and data entry. The device is configured to optimize the strength of the upper extremity of the user and is appropriately balanced to provide appropriate finger, wrist, and forearm strengthening with specific exercises.

The device can be used for strengthening one finger, all of the digits in one or both hands, and for the wrist as well as strengthening of the forearm and elbow muscles. The device is configured for prevention of injuries as well as to strengthen the upper body extremities, when used together with the forearm and elbows.

One or more embodiments of the hand exercise bracelet is formed with malleable type of materials that returns to its form as well as maintains its functional and mechanical characteristics after deformation. The device has specific entryways for the fingers and/or wrists. The device can be worn and carried by the user or it can be appropriately stored in the individual's carrying case. The various embodiments of the hand exercise bracelet will now be described with references to FIGS. 3A-3G.

Figure 3A:
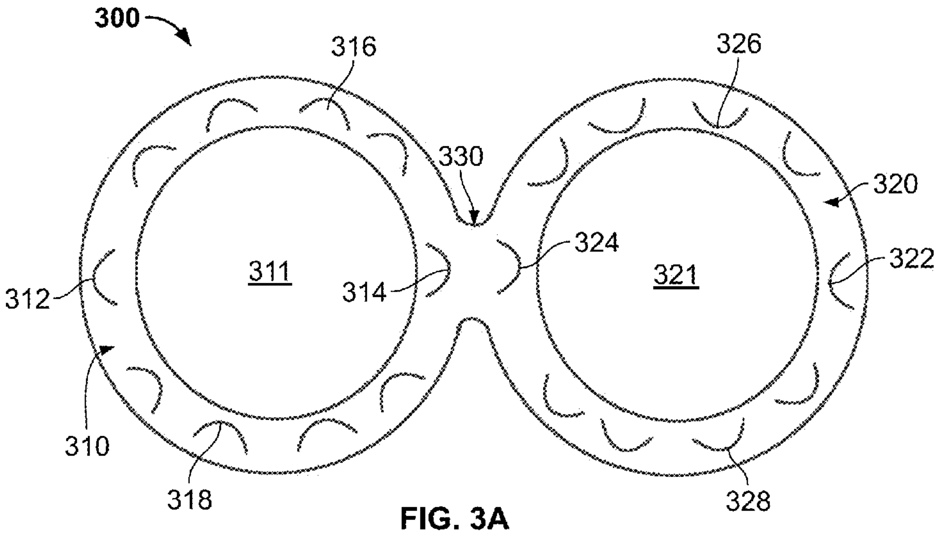
FIG. 3A is a top plan view of hand exercise brace in accordance with one or more embodiments of the present invention.
Figure 3B:
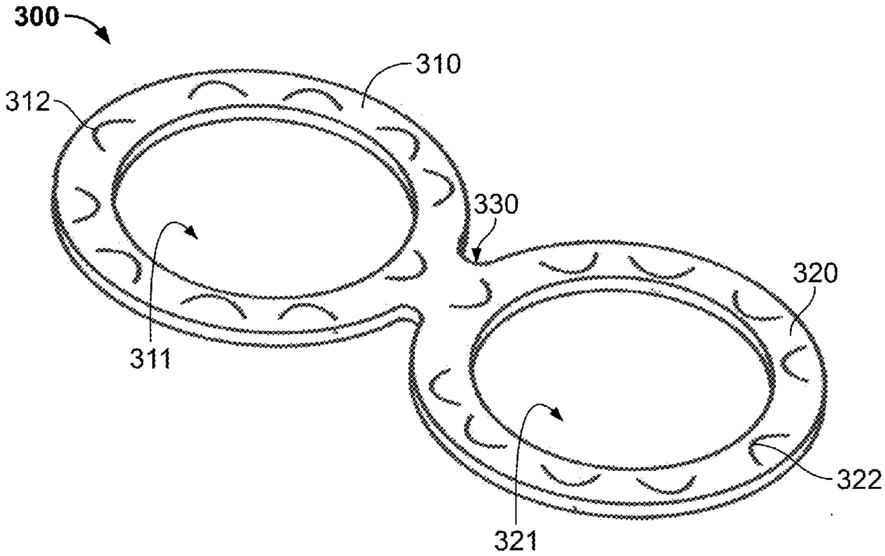
FIG. 3B is a perspective view of a hand exercise brace in accordance with one or more embodiments of the present invention.

FIG. 3A is a top plan view of hand exercise bracelet 300 and FIG. 3B is a perspective view of the hand exercise bracelet 300 in accordance with one or more embodiments of the present invention. As illustrated, the hand exercise bracelet 300 comprises a first ring 310 coupled to a second ring 320 through living hinge 330. Hand exercise bracelet 300 is preferably made of resilient material.

In one or more embodiments, the first ring 310 comprises a center hole 311 and a plurality of slots covered with flaps, e.g. 312, 314, 316, and 318, around the perimeter of the ring. Flap and slot combination 312 is at the free end of ring 310; flap and slot combination 314 is at the hinged end of ring 310; a plurality of flap and slot combinations 316 is at the top half of ring 310; and a plurality of flap and slot combinations 318 is at the bottom half of ring 310.

In one or more embodiments, the second ring 320 comprises a center hole 321 and a plurality of slots covered with flaps, e.g. 322, 324, 326, and 328, around the perimeter of the ring. Flap and slot combination 322 is at the free end of ring 320; flap and slot combination 324 is at the hinged end of ring 320; a plurality of flap and slot combinations 326 is at the top half of ring 320; and a plurality of flap and slot combinations 328 is at the bottom half of ring 320.

Each flap and slot combination on ring 310 has a complementary flap and slot combination on ring 320. For instance, flap/slot 312 is complementary to flap/slot 322; flap/slot 314 is complementary to flap/slot 324; the plurality of flap/slot 316 are complementary to the plurality of flap/slot 326; and the plurality of flap/slot 318 are complementary to the plurality of flap/slot 328. The flaps/slots complement such that when the hand exercise bracelet 300 is folded about living hinge 330, complementary flaps/slots overlap, as illustrated in FIG. 3C.

Figure 3C:
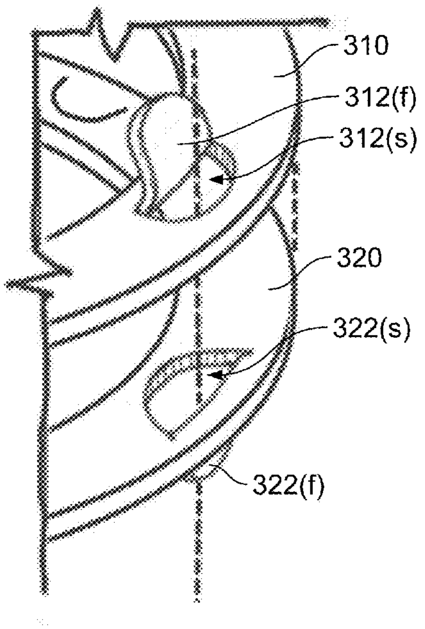
FIG. 3C is a close-up illustration of the alignment of corresponding slots of the hand exercise brace in a folded position in accordance with a second embodiment of the present invention.

FIG. 3C is a close-up illustration of the alignment of corresponding slots of the hand exercise bracelet in a folded position in accordance with a second embodiment of the present invention. As illustrated, when hand exercise bracelet is folded about hinge 330, ring 310 and ring 320 and the corresponding flap/slot combination overlap so that a user can insert a finger through both slots. For example, slot 312(*s*) is revealed when flap 312(*f*) is displaced and slot 322(*s*) is revealed when flap 322(*f*) is displaced and the centerline of the complementary slots, i.e. 312(*s*) and 322(*s*) align.

Figure 3D:
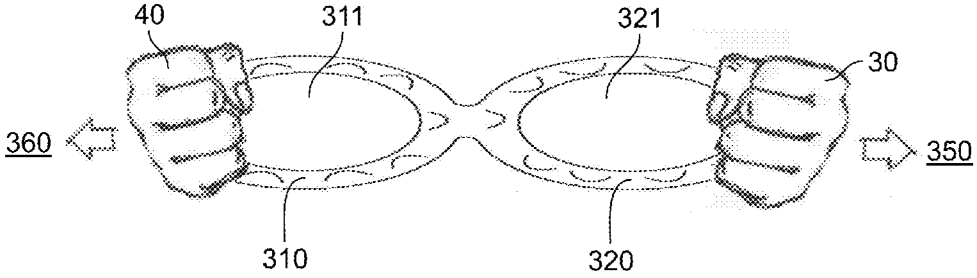
FIG. 3D is an illustration of an exemplary use of the hand exercise brace to strengthen the upper extremities in accordance with one or more embodiments of the present invention.

FIG. 3D is an illustration of an exemplary use of the hand exercise bracelet 300 to strengthen the upper extremities in accordance with one or more embodiments of the present invention. As illustrated, a user may operate the hand exercise bracelet by grabbing a ring, e.g. 320, with the left hand 30 through the center hole 321, grabbing the second ring, i.e. 310, with the right hand 40 through the center hole 311, and then applying periodic outward (i.e. pull) force, e.g. 350 and 360, thereby strengthening the upper extremities.

Figure 3E:
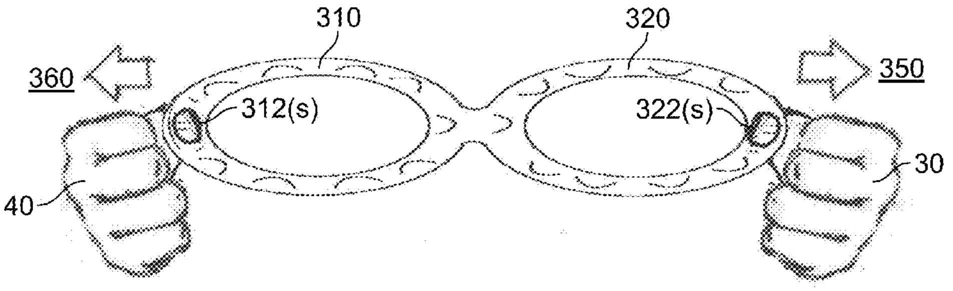
FIG. 3E is an illustration of an exemplary use of the hand exercise brace to strengthen the thumb muscles in accordance with one or more embodiments of the present invention.

FIG. 3E is an illustration of an exemplary use of the hand exercise bracelet 300 to strengthen the thumb muscles in accordance with one or more embodiments of the present invention. As illustrated, a user may operate the hand exercise bracelet by inserting the left thumb into slot 322(*s*), inserting the right thumb into slot 312(*s*), and then applying periodic outward (i.e. pull) force, e.g. 350 and 360, thereby strengthening the thumb muscles.

Figure 3F:
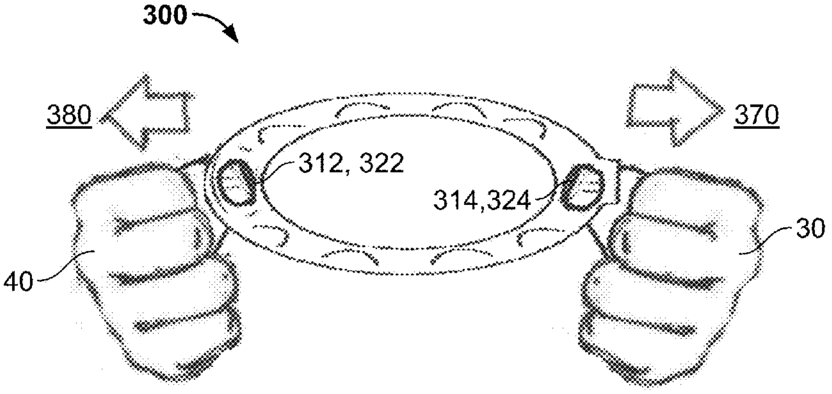
FIG. 3F is an illustration of a second exemplary use of the hand exercise brace to strengthen the thumb muscles in accordance with one or more embodiments of the present invention.

FIG. 3F is an illustration of a second exemplary use of the hand exercise bracelet 300 to strengthen the thumb muscles in accordance with one or more embodiments of the present invention. As illustrated, a user may operate the hand exercise bracelet by folding about hinge 330, then inserting the left thumb into slot 314(*s*) and its complementary slot 324(*s*), inserting the right thumb into slot 312(*s*) and its complementary slot 322(*s*), and then applying periodic outward (i.e. pull) force, e.g. 370 and 380, thereby strengthening the thumb muscles. In this configuration, because the hand exercise bracelet is folded, twice as much pull force, i.e. 370 and 380, is required than when not folded, i.e. 350 and 360.

Figure 3G:
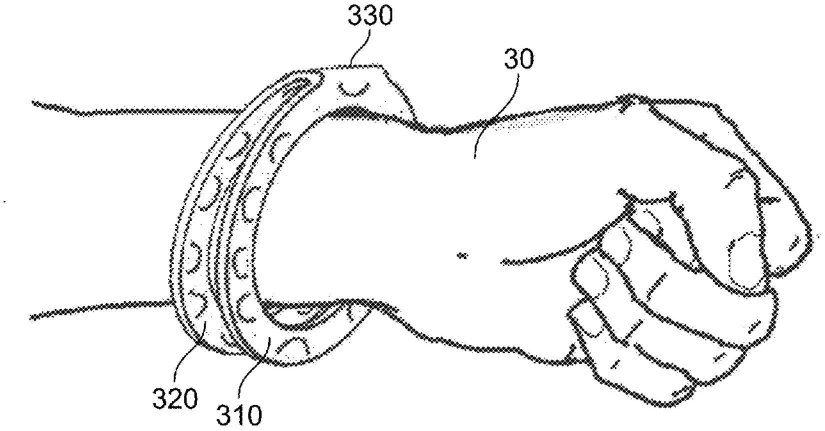
FIG. 3G is an illustration of an exemplary way to stow and carry the hand exercise brace in accordance with one or more embodiments of the present invention.

In one or more embodiments of the present invention, the hand exercise bracelet 300 folds about hinge 330 such that it can be worn over a person's wrist—just like a bracelet, as illustrated in FIG. 3G. The device is also small enough that it can be carried in a user's pocket. This makes it convenient for the user to carry the hand exercise bracelet just about anywhere.

Knuckle Bracelet for Finger Exercises

The knuckle bracelet device is ergonomically and appropriately configured to address the hand, wrist, and elbow strength musculature. The knuckle bracelet device can be used to increase the flexion and extension strength of the fingers, wrist, and forearm. The device is also intended to optimize the strengthening efforts for individuals who do extensive amounts of gaming, keyboarding as well as texting, typing, and data entry. The device is configured to optimize the strength of the upper extremity of the user and is appropriately balanced to provide appropriate finger, wrist, and forearm strengthening with specific exercises.

The device is useable with one or more fingers in one or both hands, and for the wrist as well as strengthening of the forearm muscles. The device is configured for prevention of injuries, as well as, for strengthening the upper body extremities, when used together with the forearm.

One or more embodiments of the knuckle bracelet device is formed with malleable type of materials that returns to its form as well as maintains its functional and mechanical characteristics after deformation. The device has specific entryways for the fingers. The device can be worn and carried by the user or it can be appropriately stored in the individual's carrying case. The various embodiments of the knuckle bracelet for finger exercises will now be described with references to FIGS. 4A-4D.

Figure 4A:
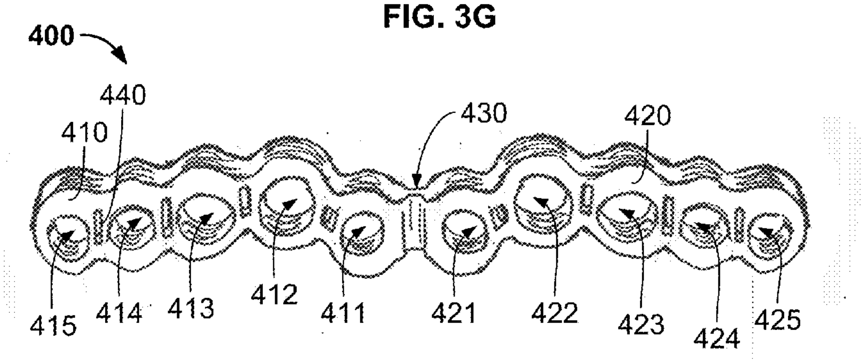
FIG. 4A is a perspective view of a hand and finger exercise device in accordance with one or more embodiments of the present invention.
Figure 4B:
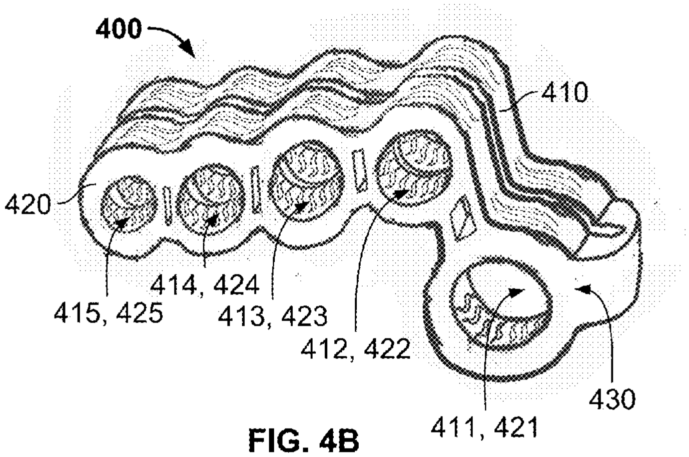
FIG. 4B is a perspective view of a hand and finger exercise device in a folded position in accordance with one or more embodiments of the present invention.

FIG. 4A is a perspective view of a hand and finger exercise knuckle bracelet 400 in an open position, and FIG. 4B is a perspective view of the hand and finger exercise device 400 in a folded position in accordance with one or more embodiments of the present invention. As illustrated, the knuckle bracelet 400 comprises a first branch 410 coupled to a second branch 420 through a living hinge 430. Knuckle bracelet 400 is preferably made of a resilient material and can be folded as a living hinge 430.

In one or more embodiments, the first branch 410 comprises a fifth digit hole 415 for the little finger, e.g. 35 and 45; a fourth digit hole 414 for the ring finger, e.g. 34 and 44; a third digit hole 413 for the middle finger, e.g. 33 and 43; a second digit hole 412 for the index finger, e.g. 32 and 42; and a first digit hole 411 for the thumb, e.g. 31 and 41. The first branch 410 may also include one or more holes 440 that functions to reduce the force required for abduction of the fingers.

In one or more embodiments, the first branch 420 comprises a fifth digit hole 425 for the little finger, e.g. 35 and 45; a fourth digit hole 424 for the ring finger, e.g. 34 and 44; a third digit hole 413 for the middle finger, e.g. 33 and 43; a second digit hole 422 for the index finger, e.g. 32 and 42; and a first digit hole 421 for the thumb, e.g. 31 and 41. The second branch 420 may also include one or more holes 440 that functions to reduce the force required for abduction of the fingers.

In one or more embodiments, the each digit hole, i.e. 411-415 and 421-425, comprises a plurality of elevated ridges on its surface to help minimize direct pressure on the muscles and vessels of the thumb and fingers. The ridges also provide a massaging effect on the thumb and fingers.

Figure 4C:
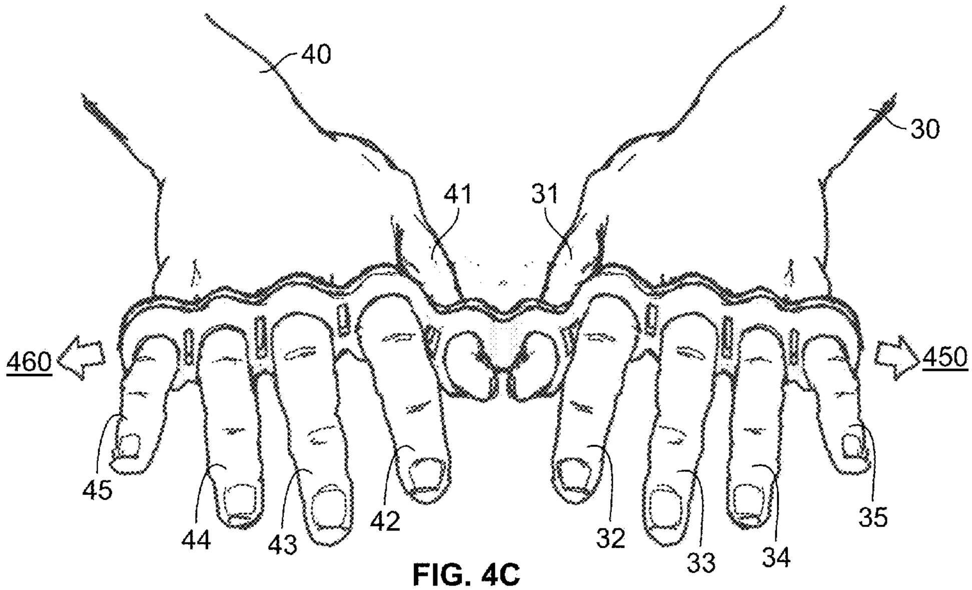
FIG. 4C is an illustration of an exemplary use of the hand and finger exercise device to strengthen the fingers and wrist muscles in accordance with one or more embodiments of the present invention.

In one or more embodiments, a user is able to perform both abduction, i.e. force directions 450 and 460, and adduction of the fingers and/or arms by inserting all the digits of both hands into the digit holes of the knuckle bracelet 400 as indicated in FIG. 4C.

FIG. 4C is an illustration of an exemplary use of the hand and finger exercise knuckle bracelet 400 to strengthen the fingers and wrist muscles in accordance with one or more embodiments of the present invention. As illustrated, a user can insert each digit finger into its appropriate digit hole. For instance, little finger 35 of the left hand is inserted into digit hole 425; ring finger 34 is inserted into digit hole 424; middle finger 33 is inserted into digit hole 423; index finger 32 is inserted into digit hole 422; and thumb 31 is inserted into digit hole 421. Also, little finger 45 of the right hand is inserted into digit hole 415; ring finger 44 is inserted into digit hole 414; middle finger 43 is inserted into digit hole 413; index finger 42 is inserted into digit hole 412; and thumb 41 is inserted into digit hole 411.

Figure 4D:
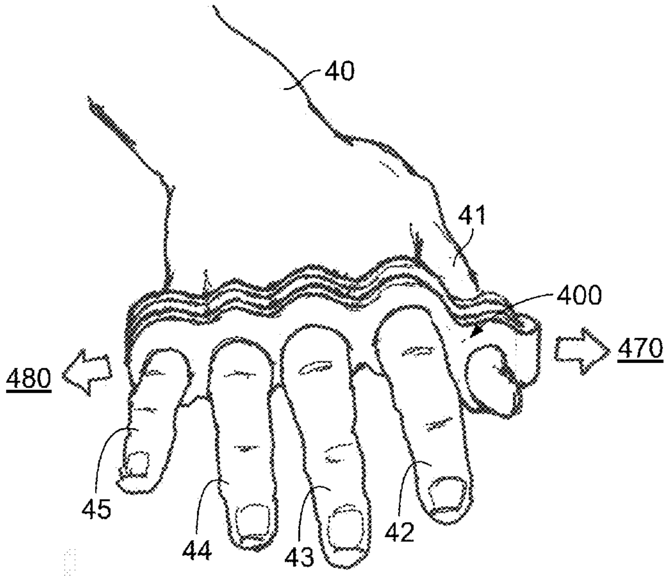
FIG. 4D is an illustration of an exemplary use of the hand and finger exercise device in a folded position to strengthen the finger muscles in accordance with one or more embodiments of the present invention.

In one or more embodiments, a user is able to perform both abduction, i.e. force directions 470 and 480, and adduction of the fingers by inserting each finger of one hand into the two digit holes from both the first and second branches when the device is folded about hinge 430, as indicated in FIG. 4D.

FIG. 4D is an illustration of an exemplary use of the hand and finger exercise knuckle bracelet 400 in a folded position to strengthen the finger muscles of one hand in accordance with one or more embodiments of the present invention. As illustrated, a user can insert each digit finger into the appropriate combination of holes. For instance, little finger 45 of the right hand is inserted into digit holes 415 and 425; ring finger 44 is inserted into digit holes 414 and 424; middle finger 43 is inserted into digit holes 413 and 423; index finger 42 is inserted into digit holes 412 and 422; and thumb 41 is inserted into digit holes 411 and 421.

Tri-Finger Exercise Device

The tri-finger exercise device is s ergonomically and appropriately configured to address the hand strength musculature. The tri-finger exercise device can be used to increase the flexion and extension strength of the fingers and thumb. The device is also intended to optimize the strengthening efforts for individuals who do extensive amounts of keyboarding as well as texting, typing, and data entry. The device is configured to optimize the strength of the upper extremity of the user and is appropriately balanced to provide hand digit strengthening with specific exercises. The device is useable with one or more fingers and thumb, preferably any three digits at a time, on one hand for strengthening of the muscles.

One or more embodiments of the tri-finger exercise device is formed with malleable type of materials that returns to its form as well as maintains its functional and mechanical characteristics after deformation. The device has specific entryways for the fingers. The device can be worn and carried by the user or it can be appropriately stored in the individual's carrying case. The various embodiments of the tri-finger exercise device will now be described with references to FIGS. 5A-5C.

Figure 5A:
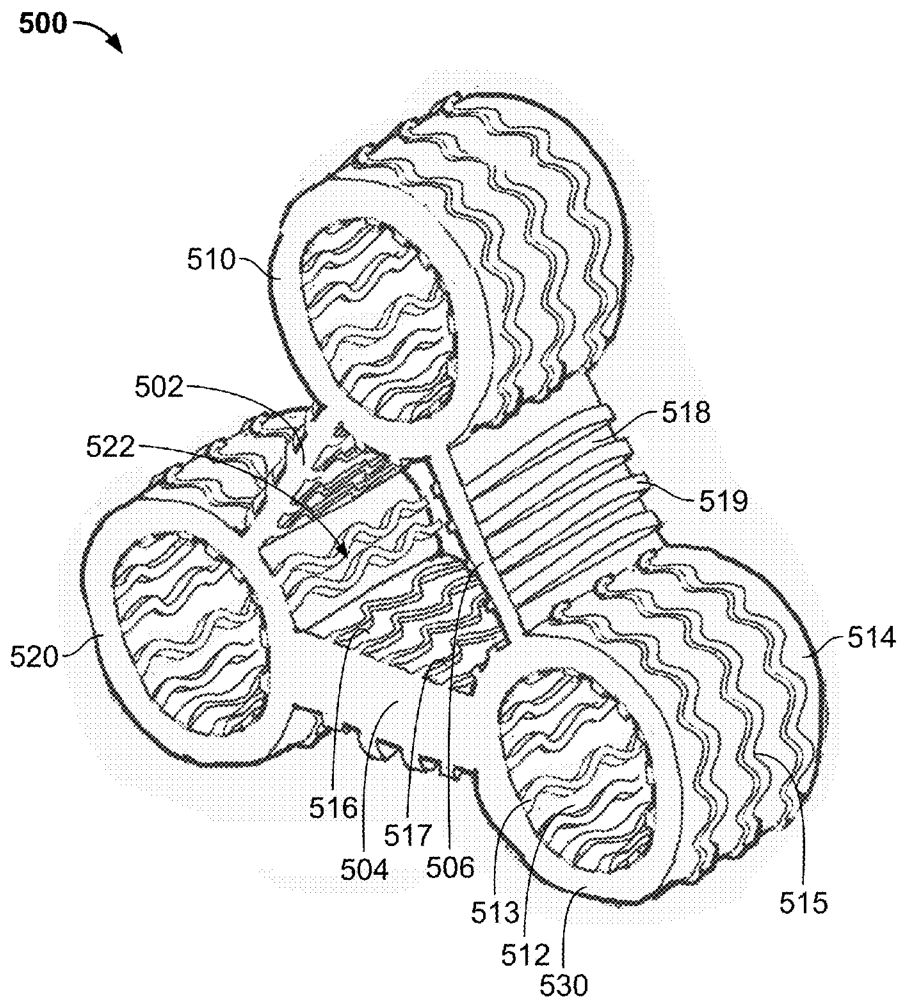
FIG. 5A is a perspective view of a tri-finger exercise device in accordance with one or more embodiments of the present invention.

FIG. 5A is a perspective view of a tri-finger exercise device 500 in accordance with one or more embodiments of the present invention. As illustrated, the tri-finger exercise device 500 comprises three rings coupled in a triangular formation. Ring 510 is coupled to ring 520 through bridge 502 and coupled to ring 530 through bridge 506; and ring 520 is coupled to ring 530 through bridge 504.

In one or more embodiments, each ring, e.g. 510, 520, or 530, comprises an inside diameter that is configured to snugly fit a person's finger or thumb and a depth that is approximately half the length of the person's finger. Each ring, e.g. 530, further comprises an inside surface 512 and an outside surface 514. The inside surface 512 of each ring comprises a plurality of elevated and flexible inner ridges 513 that are approximately sinusoidal in shape and run from the front of the ring to the back, i.e. the depth of the ring. The irregular shaped inner ridges are configured to provide massage while minimizing direct pressure on the nerves, vessels and tendons of the digits of the hand, i.e. fingers and thumb.

In one or more embodiments, the outside surface 514 of each ring, e.g. 530, comprises one or more elevated and flexible outer ridges 515 that are approximately sinusoidal in shape around the outside facing perimeter between the two connecting bridges, e.g. 504 and 506. Each ring further comprises one or more elevated ridges 522 that are approximately sinusoidal in shape and run the depth of the surface of the ring on the inside facing perimeter between the two connecting bridges, e.g. 504 and 506.

In one or more embodiments, each bridge, e.g. 502, 504, or 506, comprises an inside surface 516 and an outside surface 518. The inside surface 516 of each bridge comprises a plurality of elevated and flexible inner ridges 517 that are approximately sinusoidal in shape and run from the front of the bridge to the back, i.e. the depth or width of the bridge. The irregular shaped inner ridges 517 are configured to provide massage while minimizing direct pressure on the nerves, vessels and tendons of the digits of the hand, i.e. fingers and thumb.

In one or more embodiments, the outside surface 518 of each bridge, e.g. 506, comprises one or more elevated and flexible ridges 519 that are approximately straight and parallel and run the width of the bridge.

Figure 5B:
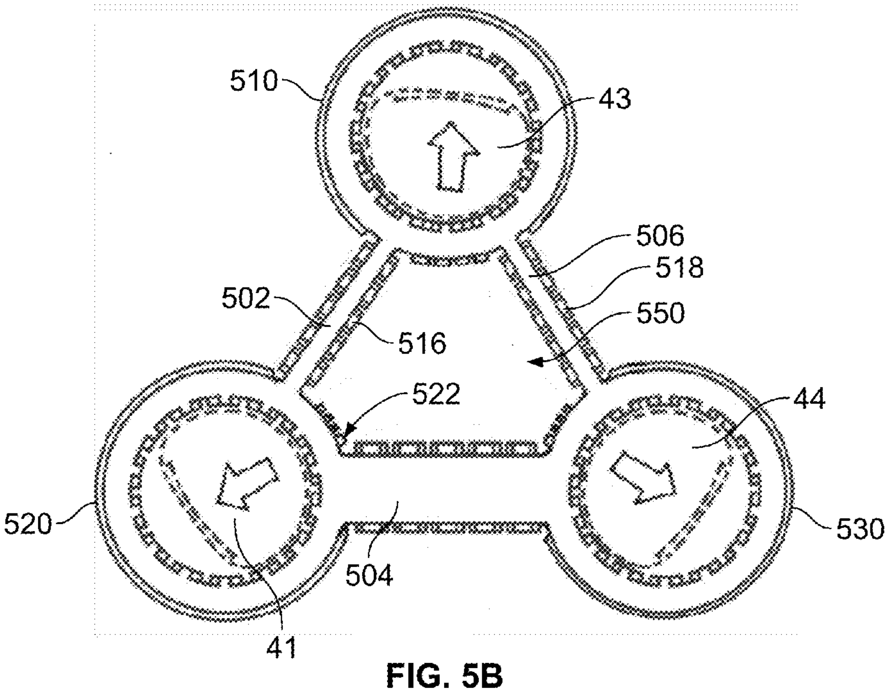
FIG. 5B is an illustration of an exemplary use of the tri-finger exercise device to strengthen the finger muscles in accordance with one or more embodiments of the present invention.

FIG. 5B is an illustration of an exemplary use of the tri-finger exercise device 500 to strengthen the finger muscles in accordance with one or more embodiments of the present invention. As illustrated, a user may place three hand digits in the rings of device 500 for abduction exercises, e.g. the thumb 41 in ring 520, middle finger 43 in ring 510 and ring finger 44 into ring 530. The user then performs abduction exercises by applying force in the directions of the arrow to strengthen the muscles of the hand.

A user may also perform adduction exercises by placing any three digits on the outside of the bridges. For example, the use may place thumb 41 on the outside of bridge 504, index finger 42 on the outside of bridge 502 and ring finger 44 on the outside of bridge 506, and squeezing to perform adduction exercises.

Figure 5C:
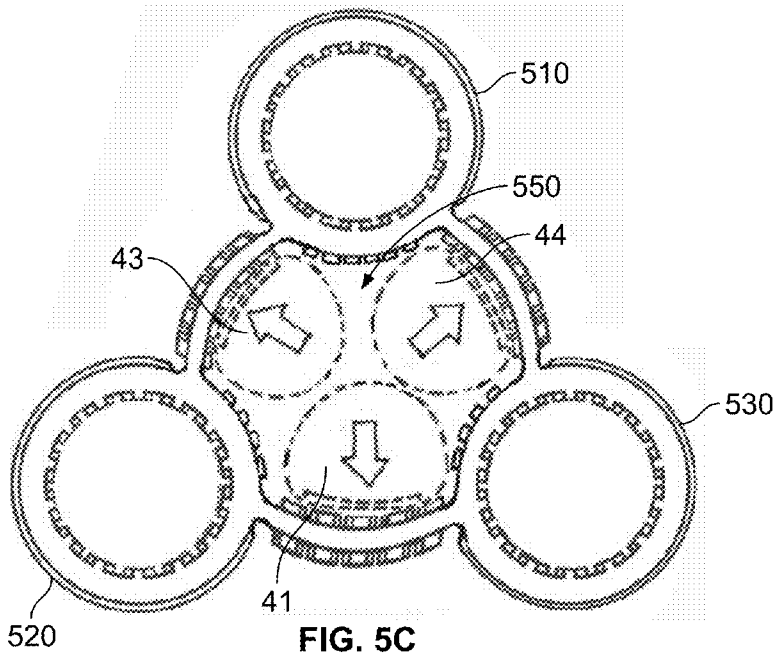
FIG. 5C is an illustration of a second exemplary use of the tri-finger exercise device to strengthen the finger muscles in accordance with one or more embodiments of the present invention.

FIG. 5C is an illustration of a second exemplary use of the tri-finger exercise device 500 to strengthen the finger muscles in accordance with one or more embodiments of the present invention. As illustrated, a user may place three hand digits, e.g. the thumb 41, middle finger 43 and ring finger 44, into the center hole 550 of device for abduction exercises. The user then performs abduction exercises by applying force in the directions of the arrow to strengthen the muscles of the hand.

While the invention herein disclosed has been described by means of specific embodiments and applications thereof, numerous modifications and variations could be made thereto by those skilled in the art without departing from the scope of the invention set forth in the claims.

What is claimed is:

1. A wrist rest apparatus comprising:

a plurality of panels coupled together to form a wrist rest assembly for a user of a hand-operable input device, wherein each panel of said plurality of panels comprises:

a wedge-shaped rectangular structure with a sloping top surface from its proximal end to its distal end;

a plurality of elevated ridges on said top surface configured to minimize direct pressure on the nerves, blood vessels and muscle tissue of the wrist and forearm;

a first flap on a left side and a second flap on a right side of said structure, wherein the first flap of a first panel is configured for coupling to the second flap of a second panel;

a plurality of glide protectors on a bottom side of the structure configured to provide resistance from sliding or slipping on a resting surface; and a heating coil inside the structure for providing warmth to a person's forearm while gaming, using a keyboard, or any other type of hand-operable input device.

2. The wrist rest apparatus of claim 1, wherein the wedge-shaped rectangular structure is a gel pad.

3. The wrist rest apparatus of claim 1, wherein the elevated ridges are compressible and slanted at an angle to provide cushioning on the forearm.

4. The wrist rest apparatus of claim 1, wherein the first flap is in a different horizontal plane as the second flap such that when two panels are coupled side by side, the assembly lays flat on a horizontal surface.

5. The wrist rest apparatus of claim 1, wherein the first flap is configured a strip and the second flap is as a slot such that when two panels are coupled side by side, the first flap of a first panel slides into the second flap of a second panel.

6. The wrist rest apparatus of claim 1, wherein the glide protectors comprise a softer rubbery material than the panel structure.

7. The wrist rest apparatus of claim 1, wherein the input device is keyboard, mouse, or game console.

8. A wrist rest apparatus comprising:

a wedge-shaped rectangular panel structure with a sloping top surface from its proximal end to its distal end;

a plurality of elevated ridges on said top surface configured to minimize direct pressure on the nerves, blood vessels and muscle tissue of the wrist and forearm;

a first flap on a left side and a second flap on a right side of said panel, wherein said first flap of a first panel is configured for coupling to said second flap of a second panel;

a plurality of glide protectors on a bottom side of the panel configured to provide resistance from sliding or slipping on a resting surface; and a heating coil inside the panel structure for providing warmth to a person's forearms while gaming, using a keyboard, or any other type of hand-operable input device.

9. The wrist rest apparatus of claim 8, wherein the wedge-shaped rectangular structure is a gel pad.

10. A wrist rest apparatus comprising:

a wedge-shaped rectangular panel structure with a sloping top surface from its proximal end to its distal end;

a plurality of elevated ridges on said top surface configured to minimize direct pressure on the nerves, blood vessels and muscle tissue of the wrist and forearm; and a plurality of glide protectors on a bottom side of the panel configured to provide resistance from sliding or slipping on a resting surface.

11. The wrist rest apparatus of claim 10, further comprising a heating coil inside the panel structure for providing warmth to a person's forearms while gaming, using a keyboard, or any other type of hand-operable input device.

12. The wrist rest apparatus of claim 10, further comprising a first flap on a left side and a second flap on a right side of said panel, wherein the first flap of a first panel is configured for coupling to the second flap of a second panel.

* * * * *